Aug. 30, 1949.                W. W. CARRIER                2,480,320
                                FILTER
                          Filed Feb. 10, 1945

Inventor
Worthy W. Carrier
By Williamson & Williamson
            Attorneys

Patented Aug. 30, 1949

2,480,320

UNITED STATES PATENT OFFICE 2,480,320

FILTER

Worthy W. Carrier, Minneapolis, Minn., assignor to Vic Cleaning Machine Co., Minneapolis, Minn., a partnership composed of Charles Victor, Oscar Victor, Jr., and Worthy W. Carrier Application February 10, 1945, Serial No. 577,311

3 Claims. (Cl. 210—182)

1

This invention relates to filters particularly adapted for removing impurities from cleaning fluids used in dry cleaning clothing and the like.

It is an object of the invention to provide a filter structure wherein the sludge which accumulates on the surfaces of the filtering elements can be quickly and efficiently removed without injuring the filter cloth and without requiring removal of the filtering elements from the apparatus.

Another object of the invention is to provide filtering apparatus arranged to be oscillated in the filter tank wherein improved means is provided for supporting the filtering elements and moving them as a unit during the sludge removal operation without in any way injuring the filtering elements.

These and other objects and advantages of the invention will more fully appear from the following description made in connection with the accompanying drawings, wherein like reference characters refer to the same parts throughout the views, and, in which.

Figure 1:
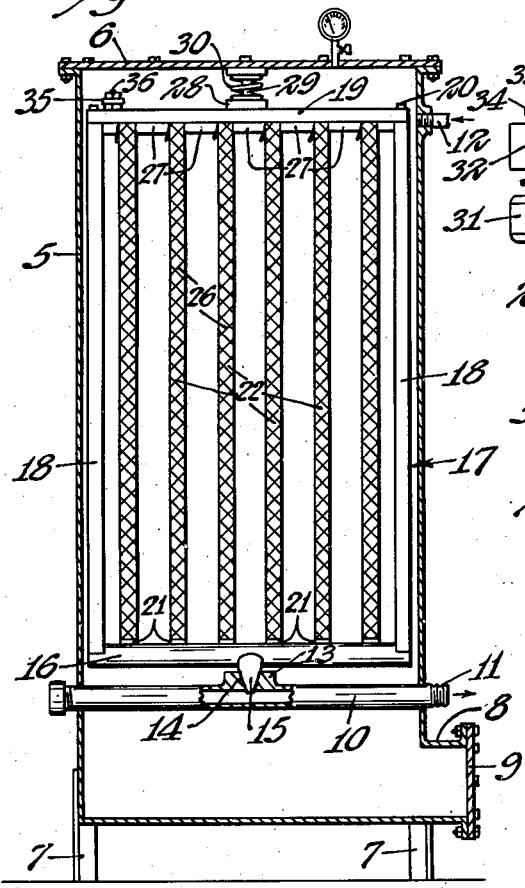
Figure 1 is a longitudinal vertical sectional view through a filter casing showing the filtering elements in end elevation.

In the drawing there is shown a casing 5 which may be of cylindrical shape. The casing has a removable top 6 and is supported by suitable legs 7. A sludge removal pipe 8 which is normally closed by a plate 9 is shown located at the lower portion of the casing 5. A cleaning fluid outlet pipe 10 is suitably supported across the interior of the casing 5 and has a threaded end 11 extending outwardly of the casing to provide a connection to the dry cleaning machine. A cleaning fluid inlet pipe 12 is shown connected to the upper portion of the casing 5 in Figure 1.

Figure 2:
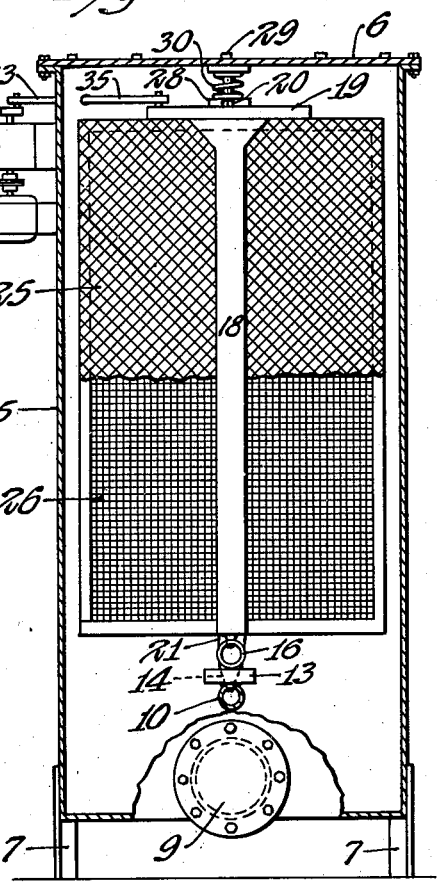
Figure 2 is a longitudinal vertical sectional view through the apparatus looking at right angles to Figure 1.

The stationary outlet pipe 10 is provided with a nozzle connection 13 which, as shown in Figure 2, has a frusto-conical passageway 14 disposed vertically therethrough. The passageway 14 provides a rotary supporting seat for a flow outlet member 15 of frusto-conical shape, said member 15 being connected to the lower member 16 of a filtering element supporting frame indicated generally at 17. The frame 17 has side members 18 which at their upper ends are connected by a removable top member 19 which may conveniently be secured by bolts 20.

The frame cross member 16 is provided with a plurality of flow connections 21 which are constructed generally like the flow connection 13 on the stationary conduit 10, each of said connections 21 having a frusto-conical seat to provide flow communication to the interior of the frame member 16 which is hollow and thence through the flow outlet member 15 to the outlet pipe 10.

In Figure 1 there is shown a plurality of individual filtering elements 22 each of which has a frusto-conical outlet member 23 adapted to be removably supported in its respective frusto-conical seat in a flow connection member 21 on the lower frame portion 16.

Figure 4:
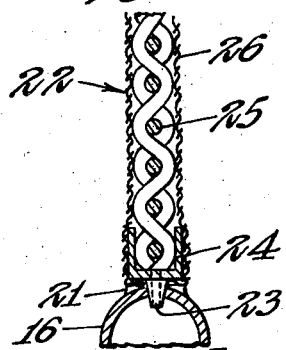
Figure 4 is an enlarged fragmentary sectional view through one of the filtering elements.

The specific structure of the filtering elements is of no particular importance. A typical structure for use in connection with my invention is shown in Figure 4. It includes a channel shaped frame 24 extending about the edges of a woven wire panel 25 and a fabric cover or bag 26 is adapted to enclose the entire filter element.

Figure 3:
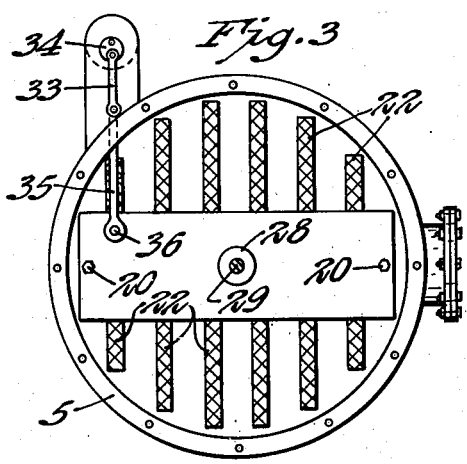
Figure 3 is a top plan view of the apparatus with the casing cover removed.

The upper frame member 19 is provided on its lower side with a plurality of spaced downwardly projecting elements 27 between which are received the upper ends of the individual filter elements 22, and as shown in Figures 1 and 3, said elements 22 are maintained in the frame 17 in spaced relation to each other.

The upper side of the frame member 19 is provided with a centrally disposed socket 28 adapted to receive a pivot member 29 extending downwardly from the central part of the casing cover 6, and a compression spring 30 is interposed between the cover 6 and the socket 28 on the upper frame member 19.

Mounted on the side of the casing 5 is a motor 31 connected through transmission gearing 32 to an arm 33 by means of a crank 34. The arm 33 connects with another arm 35 which extends through the side wall of the casing 5 and is adapted to reciprocate relative thereto. The inner end of the arm 35 is pivotally connected at 36 to an end portion of the upper frame member 19 as shown in Figure 3.

From the foregoing description it will be seen that I have provided a filtering unit made up of a plurality of individual filtering elements which are supported in the unit in spaced relation to each other and are supported in such a way that they can be oscillated in the casing as a unit, the motion imparted to the filtering elements while in the cleaning liquid being sufficient to efficiently remove sludge from the filter cloths or bags 26 whereupon it will drop into the lower portion of the casing 5 below the outlet pipe 10. At infrequent intervals the sludge can be removed through the sludge outlet 8.

My apparatus permits the cleaning of the filtering elements without removing the filtering elements from the casing and it is a relatively simple matter to remove the casing cover 6 and the upper frame member 19 in order to remove one or more filtering elements after long usage in the event a filter bag has become rotted.

Some types of filters of this general class utilize a reversal of flow of the cleaning liquid so that it would come in through the pipe 10 to the hollow lower frame member 16 and thence upwardly into the interiors of the filter bags 26 to wash the sludge from the outer surfaces of the bags. While this reverse flow method can be used it has been found that it is unnecessary with my structure. As a matter of fact, the normal cleaning operation can be continued while the filters are being cleaned of sludge since the motor 31 can be operated to oscillate the filtering elements in their unitary frame 17 while the cleaning fluid is flowing in through the inlet pipe 12 and out through the outlet conduit 10. This saves considerable time and expense since it is unnecessary to stop the normal operation of the dry cleaning machine to clean the filter bags.

It will, of course, be understood that various changes may be made in the form, details, arrangement and proportions of the various parts without departing from the scope of my invention.

What I claim is:

1. In a filter, a casing having a fluid inlet and a clean-out opening, a stationary tubular supporting member mounted within the casing and extending at least to the longitudinal axis thereof and having a fluid inlet disposed within the casing and having a fluid outlet extending exteriorly of said casing, a filter element supporting frame having a pivot element pivotally supported by said tubular supporting member within said casing, said frame having a part thereof formed to provide a fluid conduit having an inlet and having an outlet extending through said pivot member and in fluid communication with the inlet of said stationary tubular supporting member, a hollow filter element mounted in said frame in fluid communication with the inlet of the latter, and means for imparting oscillating movement to said frame and thereby the filter element.

2. In a filter, in accordance with claim 1, wherein the part of the filter element supporting frame which provides a fluid conduit is formed with a plurality of spaced inlets, and a plurality of spaced hollow filter elements, one each of which is in fluid communication with one each of said spaced inlets.

3. In a filter, in accordance with claim 1, wherein the filter element supporting frame is of substantially rectangular form, and said hollow filter element is likewise of substantially rectangular form and is disposed transversely of said frame.

WORTHY W. CARRIER.

REFERENCES CITED

The following references are of record in the file of this patent:

UNITED STATES PATENTS

| Number | Name | Date |
| --- | --- | --- |
| 544,291 | Davidson | Aug. 13, 1895 |
| 782,950 | Dion | Feb. 21, 1905 |
| 1,670,319 | Sweetland | May 22, 1928 |
| 1,812,042 | Genter | June 30, 1931 |
| 2,013,776 | Weisman | Sept. 10, 1935 |
| 2,243,559 | Griffith | May 27, 1941 |
| 2,276,118 | Taylor | Mar. 10, 1942 |
| 2,301,430 | Malanowski | Nov. 10, 1942 |
| 2,346,682 | Harris | Apr. 18, 1944 |
| 2,392,666 | Harris | Jan. 8, 1946 |

FOREIGN PATENTS

| Number | Country | Date |
| --- | --- | --- |
| 600,703 | Germany | July 12, 1934 |